US009976766B2

United States Patent
Tanaka et al.

(10) Patent No.: US 9,976,766 B2
(45) Date of Patent: May 22, 2018

(54) AIR-CONDITIONING APPARATUS

(75) Inventors: Kosuke Tanaka, Tokyo (JP); Hiroaki Makino, Tokyo (JP); Akinori Sakabe, Tokyo (JP); Tadashi Ariyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 762 days.

(21) Appl. No.: 14/391,761

(22) PCT Filed: Apr. 26, 2012

(86) PCT No.: PCT/JP2012/002857
§ 371 (c)(1),
(2), (4) Date: Oct. 10, 2014

(87) PCT Pub. No.: WO2013/160949
PCT Pub. Date: Oct. 31, 2013

(65) Prior Publication Data
US 2015/0052922 A1 Feb. 26, 2015

(51) Int. Cl.
*F24F 11/00* (2018.01)
*F25B 49/02* (2006.01)
(Continued)

(52) U.S. Cl.
CPC .......... *F24F 11/008* (2013.01); *F24F 11/30* (2018.01); *F24F 11/62* (2018.01); *F24F 11/70* (2018.01);
(Continued)

(58) Field of Classification Search
CPC .................. F24F 11/006; F25B 49/02
See application file for complete search history.

(56) References Cited

U.S. PATENT DOCUMENTS 4,744,511 A * 5/1988 Kakehi ............. B60H 1/00807
165/202
4,893,480 A * 1/1990 Matsui ................ B60H 1/3205
62/225
(Continued)

FOREIGN PATENT DOCUMENTS

JP 63-008802 A 1/1988
JP 03-028676 A 2/1991
(Continued)

OTHER PUBLICATIONS

Wikipedia article on Time Constant, [online], [retrieved from the internet on Oct. 30, 2017] retrieved using Internet <URL:https://en.wikipedia.org/wiki/Time_constant>.*
(Continued)

Primary Examiner — Ljiljana Ciric
Assistant Examiner — Alexis Cox
(74) Attorney, Agent, or Firm — Posz Law Group, PLC

(57) ABSTRACT

An air-conditioning apparatus includes a time constant calculation unit that estimates a response time constant at a time when an opening degree of an expansion device is changed on the basis of specifications of a compressor that forms a refrigeration cycle of the air-conditioning apparatus, specifications of a load side heat exchanger, and an operating state quantity of the air-conditioning apparatus, a control constant calculation means that calculates at least one of a control gain of the opening degree of the expansion device and a control interval on the basis of a calculation result of the time constant calculation means, and a control constant change means that changes a control constant.

7 Claims, 6 Drawing Sheets

(51) Int. Cl.
  *G05B 15/02* (2006.01)
  *F25B 13/00* (2006.01)
(52) U.S. Cl.
  CPC .............. *F24F 11/83* (2018.01); *F25B 49/02* (2013.01); *F24F 11/84* (2018.01); *F25B 13/00* (2013.01); *F25B 2313/0314* (2013.01); *F25B 2600/01* (2013.01); *F25B 2600/2513* (2013.01); *F25B 2700/2104* (2013.01); *F25B 2700/21151* (2013.01); *F25B 2700/21152* (2013.01); *G05B 15/02* (2013.01)

(56) References Cited

U.S. PATENT DOCUMENTS

| | | | | |
|---|---|---|---|---|
| 5,222,371 | A * | 6/1993 | Doyama | F24F 3/065 62/204 |
| 5,335,164 | A * | 8/1994 | Gough, Jr. | G05B 13/024 700/29 |
| 5,436,852 | A * | 7/1995 | Kon | G01W 1/17 236/91 C |
| 5,687,077 | A * | 11/1997 | Gough, Jr. | G05B 13/042 700/29 |
| 5,867,998 | A * | 2/1999 | Guertin | F25B 49/02 62/211 |
| 2008/0255814 | A1 * | 10/2008 | Chia | G05B 13/048 703/6 |
| 2010/0089084 | A1 * | 4/2010 | Aiyama | F25B 41/062 62/225 |
| 2013/0312442 | A1 * | 11/2013 | Suzuki | B60H 1/00921 62/160 |

FOREIGN PATENT DOCUMENTS

| | | |
|---|---|---|
| JP | 2515716 B2 | 4/1996 |
| JP | 2001-012808 A | 1/2001 |
| JP | 2003-129956 A | 5/2003 |
| JP | 2003-222369 A | 8/2003 |
| JP | 2007-040567 A | 2/2007 |
| JP | 2007-255845 A | 10/2007 |
| PA | 03-080261 U | 8/1991 |

OTHER PUBLICATIONS

Extended European Search Report dated Feb. 26, 2016 issued in corresponding EP patent application No. 12875142.7.
Office Action dated May 5, 2016 in the corresponding CN application No. 201280072639.X.
International Search Report of the International Searching Authority dated Aug. 7, 2012 for the corresponding international application No. PCT/JP2012/002857 (and English translation).
Office Action dated Dec. 8, 2015 issued in corresponding JP patent application No. 2014-512018 (and English translation).

* cited by examiner

F I G. 6
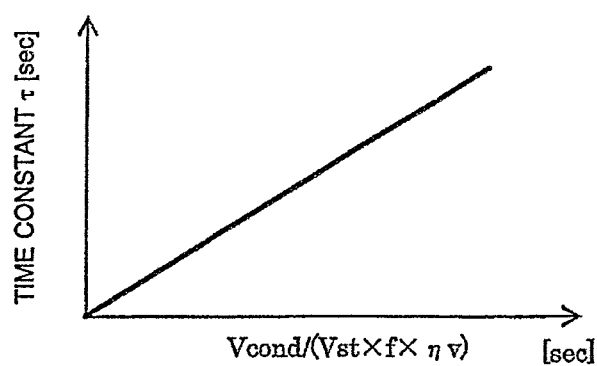

AIR-CONDITIONING APPARATUS

CROSS REFERENCE TO RELATED APPLICATION

This application is a U.S. national stage application of PCT/JP2012/002857 filed on Apr. 26, 2012, the contents of which are incorporated herein by reference.

TECHNICAL FIELD

The present invention relates to a refrigeration cycle, and more particularly, relates to a control device for an electric expansion valve. The control device is suitable for use in controlling the state quantity of the refrigeration cycle.

BACKGROUND

Conventionally, as a method for controlling the flow rate of a refrigerant using an electric expansion valve so that the state quantity of a refrigeration cycle, such as temperature, pressure, or the like of the refrigerant is to be a predetermined value, a method has been proposed in which the control gain of PID control stored in a microcomputer in advance is calculated in accordance with indoor temperature, outdoor temperature, and rotation speed of a compressor, and the electric expansion valve is driven by PID control to thereby control the flow rate of the refrigerant (see, for example, Patent Literature 1).

Another method has been proposed in which the control gain and control intervals of PID control stored in advance as a table in a microcomputer are determined in accordance with the number of interconnected indoor units which are in operation and a deviation from a control target value, and an electric expansion valve is driven by PID control to thereby control the flow rate of a refrigerant (see, for example, Patent Literature 2).

In addition, there has been another method proposed in which the control gain and control intervals of PID control are determined in accordance with the opening degree of an electric expansion valve, the compressor operating capacity, and a deviation from a control target value, and the electric expansion valve is driven by PID control to thereby control the flow rate of a refrigerant (see, for example, Patent Literature 3).

PATENT LITERATURE

Patent Literature 1: Japanese Patent No. 2515716 (Page 3, FIG. 6)

Patent Literature 2: Japanese Unexamined Patent Application Publication No. 3-28676 (Page 5, Table 2)

Patent Literature 3: Japanese Unexamined Patent Application Publication No. 2001-012808 (Page 7, FIG. 2)

However, the known air-conditioning apparatuses have the following problems: First, in the control described in Patent Literature 1, the control gain of PID control is a system specific value of the air-conditioning apparatus, and therefore, when the type of a refrigerant and the internal capacity of a heat exchanger of the air-conditioning apparatus differ, the time constant and the dead time also differ. Accordingly, each time the specifications or model of the air-controlling apparatus changes, the optimal control gain and control intervals need to be obtained by performing a test and a simulation and stored in a microcomputer, and therefore, a problem arises in which a huge storage area is needed and a vast amount of time is spent in order to determine a constant.

In the control described in each of Patent Literature 2 and Patent Literature 3, the gain and control intervals are determined in accordance with the number of indoor units in operation and a deviation from a control target value. However, the control constant is held in a table and thus is a certain value (a fixed value) even when an operation state, such as indoor and outdoor environmental conditions, the amount of a circulating refrigerant, or the like, has changed, and an influence caused when the operation state has changed, for example, such that the pressure becomes high or low in a refrigeration cycle is not taken into consideration. Thus, it is difficult to perform control in an optimal state in accordance with the environmental condition and operation state at all the time. Therefore, a system of the refrigeration cycle is not stabilized, hunting is caused, and the air-conditioning capacity is not stabilized. Under certain circumstances, a problem arises in which the overshoot amount is large to cause excessive rise of high-pressure side pressure or reduction of low-pressure side pressure and the operation has to be suspended for the purpose of protecting operation of air-conditioning equipment.

SUMMARY

In view of the foregoing, the present invention has been devised, and therefore, it is an object of the present invention to provide an air-conditioning apparatus capable of being controlled optimally in which the control gain or control intervals of an electric expansion valve is optimized in accordance with the operation state of the air-conditioning apparatus and the system configuration thereof and overshoot is reduced in the shortest settling time at all the time such that the value of a control object is to be a control target value.

In order to achieve the above-described object, the following has been devised according to the present invention.

An air-conditioning apparatus according to the present invention is an air-conditioning apparatus in which at least one load side unit including a load side heat exchanger is connected to a heat source side unit including a compressor, a heat source side heat exchanger, and an expansion device, and a refrigerant is circulated between the units to form a refrigeration cycle, the apparatus control constant calculation means that calculates at least one of a control gain of the opening degree of the expansion device, the control gain being a control constant of the opening degree of the expansion device, and a control interval on the basis of an operating state quantity of the refrigeration cycle of the air-conditioning apparatus; and control constant change means that changes the control gain or the control interval on the basis of the calculation result of the control constant calculation means, and expansion device control means that changes the opening degree of the expansion device on the basis of the control constant.

An optimal operation in which the settling time is minimum under the condition where the overshoot radio is within an allowable range at all times can be achieved in accordance with the system configuration and operating state of the air-conditioning apparatus.

BRIEF DESCRIPTION OF DRAWINGS

FIG. 6 is a graph illustrating the relationship among condenser internal capacity, compressor frequency, volumetric efficiency, and response time constant of the suction degree of superheat.

DETAILED DESCRIPTION

Embodiment 1

Embodiment 1 of the present invention will be described below in detail with reference to the accompanying drawings.

Figure 1:
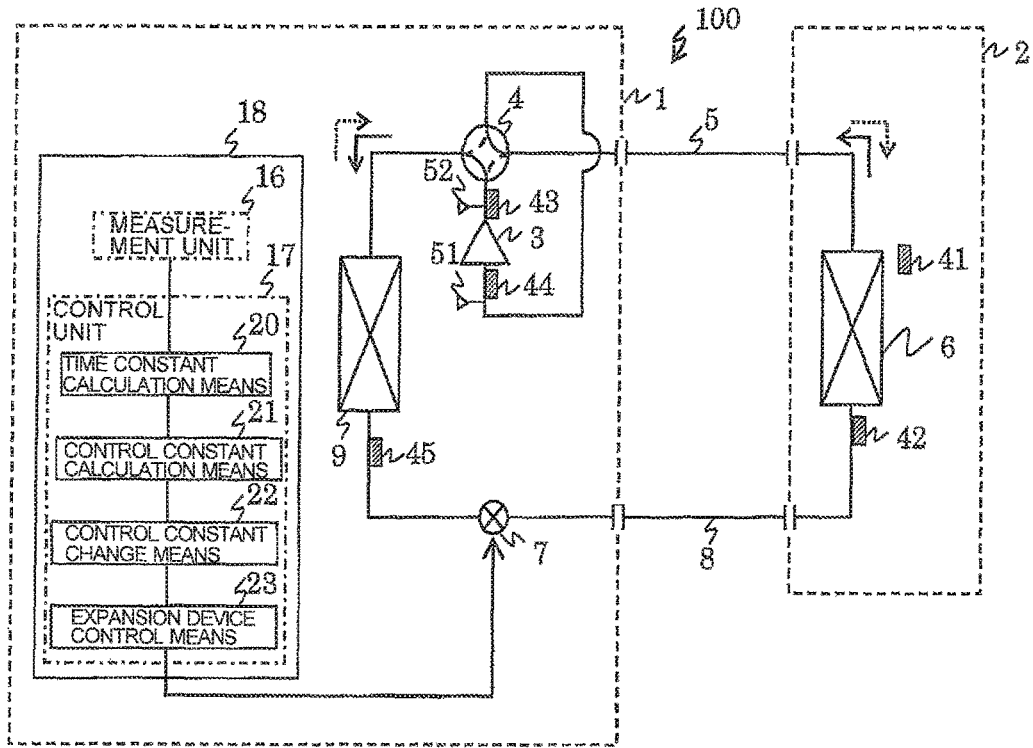
FIG. 1 is a system chart of an air-conditioning apparatus according to Embodiment 1 of the present invention.

FIG. 1 is a circuit diagram of a refrigerant circuit of an air-conditioning apparatus 100 according to Embodiment 1 of the present invention. The air-conditioning apparatus 100 includes an outdoor unit 1 and an indoor unit 2. A compressor 3, a four-way valve 4 serving as a flow switching valve that performs operation switching between heating and cooling, an expansion device 7, and an outdoor heat exchanger (a heat source side heat exchanger) 9 are installed in the outdoor unit 1. An indoor heat exchanger (a load side heat exchanger) 6 is installed in the indoor unit 2.

The compressor 3 is a type of compressor in which the rotation speed is controlled by an inverter and the capacity is controlled.

The expansion device 7 is an electric expansion valve the opening degree of which is variably controlled. The outdoor heat exchanger 9 exchanges heat with outside air ventilated by a fan, or the like. A gas tube 5 and a liquid tube 8 are connection tubes that connect the outdoor unit 1 and the indoor unit 2.

Refrigerants that can be used for a refrigeration cycle of the air-conditioning apparatus 100 include a zeotropic refrigerant mixture, a near-azeotropic refrigerant mixture, a single refrigerant, and the like. Zeotropic refrigerant mixtures include R407C (R32/R125/R134a), which is a hydrofluorocarbon (HFC) refrigerant, and the like. Such a zeotropic refrigerant mixture is a mixture of refrigerants having boiling points different from each other, and thus, has a characteristic in which the composition ratio differs between a liquid phase and a gas phase. Near-azeotropic refrigerant mixtures include R410A (R32/R125), R404A (R125/R143a/R134a), each of which is an HFC refrigerant, and the like. Such a near-azeotropic refrigerant mixture has, in addition to a similar characteristic to that of the zeotropic refrigerant mixture, a characteristic in which it has a working pressure that is about 1.6 times the working pressure of R22.

Single refrigerants include R22, which is a hydrochlorofluorocarbon (HCFC) refrigerant, R134a, which is a HFC refrigerant, R1234yf and R1234ze, which are hydrofluoroolefin (HFO) refrigerants, and the like. Such a single refrigerant is not a mixture, and therefore, has a characteristic that it can be easily handled. In addition to the above-described refrigerants, carbon dioxide, propane, isobutene, ammonia, and the like, may be used. Note that R22, R32, R125, R134a, and R143a represent chlorodifluoromethane, difluoromethane, pentafluoroethane, 1,1,1,2-tetrafluoroethane, and 1,1,1-trifluoroethane, respectively. Accordingly, a refrigerant suitable for use and the purpose of the air-conditioning apparatus 100 may be used.

A measurement control device 18 and a plurality of thermal sensors are installed in the outdoor unit 1. A thermal sensor 43, a thermal sensor 44, and thermal sensor 45 measure refrigerant temperatures in an installation location at a discharge side of the compressor 3, an installation location at a suction side of the compressor 3, and an installation location between the outdoor heat exchanger 9 and the expansion device 7, respectively. Furthermore, pressure sensors 51 and 52 are installed in the outdoor unit 1 and the pressure sensor 51 and the pressure sensor 52 measure the pressure of a refrigerant to be sucked into the compressor 3 and the pressure of a refrigerant discharged from the compressor 3, respectively.

Thermal sensors 41 and 42 are installed in the indoor unit 2. The thermal sensor 42 is provided between an indoor heat exchanger 6 and the expansion device 7 and measures the temperature of a refrigerant flowing therein. The thermal sensor 41 measures the temperature of air sucked into the indoor heat exchanger 6. Note that, when a heat medium that is to be a load is some other medium, such as water, the thermal sensor 41 measures the inflow temperature of the medium.

The measurement control device 18 of the outdoor unit 1 includes a measurement unit 16 that measures operating information instructed by each sensor and a user of the air-conditioning apparatus and a control unit 17 that controls, on the basis of the measured information, a method for operating the compressor 3, flow switching of the four-way valve 4, the fan ventilation amount of the outdoor heat exchanger 9, the opening degree of the expansion device 7, and the like. Note that FIG. 1 illustrates only a case where an operation object is an expansion device and does not illustrate other operation objects. Also, the measurement unit 16 holds in advance information about the respective internal capacities of the indoor heat exchanger 6 and the outdoor heat exchanger 9 and the (liquid) displacement amount of the compressor.

Next, the cooling operation of the air-conditioning apparatus 100 will be described with reference to FIG. 1. When the cooling operation is performed, the flow switched in the four-way valve 4 is set to extend in the direction in which the solid line extends in FIG. 1. A high-temperature, high-pressure gas refrigerant discharged from the compressor 3 is condensed and liquefied, while passing through the four-way valve 4 and transferring heat in the outdoor heat exchanger 9 that is to serve as a condenser, to be a high-pressure liquid refrigerant. The high-pressure refrigerant that has come out of the outdoor heat exchanger 9 flows, after being decompressed by the expansion device 7, into the indoor unit 2 via the liquid tube 8, and then, into the indoor heat exchanger 6 that is an evaporator, removes heat there, and is thus evaporated and gasified. Cooling is performed by removing heat from a load side medium, such as air, water at the indoor unit side, and the like. Thereafter, the evaporated and gasified refrigerant flows into the outdoor unit 1 via the gas tube 5. Then, the refrigerant is sucked by the compressor 3 via the four-way valve 4.

In the air-conditioning apparatus 100, the cooling capacity that the air-conditioning apparatus 1 is required to have changes in accordance with the heat load at the indoor side, and therefore, the air-conditioning apparatus 100 needs to cope with the change of the cooling capacity required when a cooling operation is performed. Thus, in the air-conditioning apparatus 100, control is performed to change the operating capacity of the compressor 3 such that the temperature detected by the thermal sensor 41 at the indoor side (the load side) becomes close to the indoor temperature instructed by the user of the air-conditioning apparatus. In this case, control of the operating capacity of the compressor 3 is performed by changing the operating frequency f of the compressor 3.

Next, an example method for controlling the expansion device 7 according to a feature of the present invention will be described with reference to FIG. 2. The air-conditioning apparatus 100 controls the opening degree of the expansion device 7 such that the degree of superheat SH of the refrigerant to be sucked into the compressor 3 is a target degree of superheat SHm. In this case, the degree of superheat SH of a refrigerant in suction of the compressor 3 is calculated from a suction pressure Ps detected by the pressure sensor 51 and a refrigerant temperature Ts detected by the thermal sensor 44 of a suction unit of the compressor 3. More specifically, first, the suction pressure Ps detected by the pressure sensor 51 is converted into the saturation temperature of the refrigerant to obtain an evaporating temperature Te. Then, the evaporating temperature Te is deducted from the refrigerant temperature Ts detected by the thermal sensor 44 to obtain the degree of superheat SH.

Figure 2:
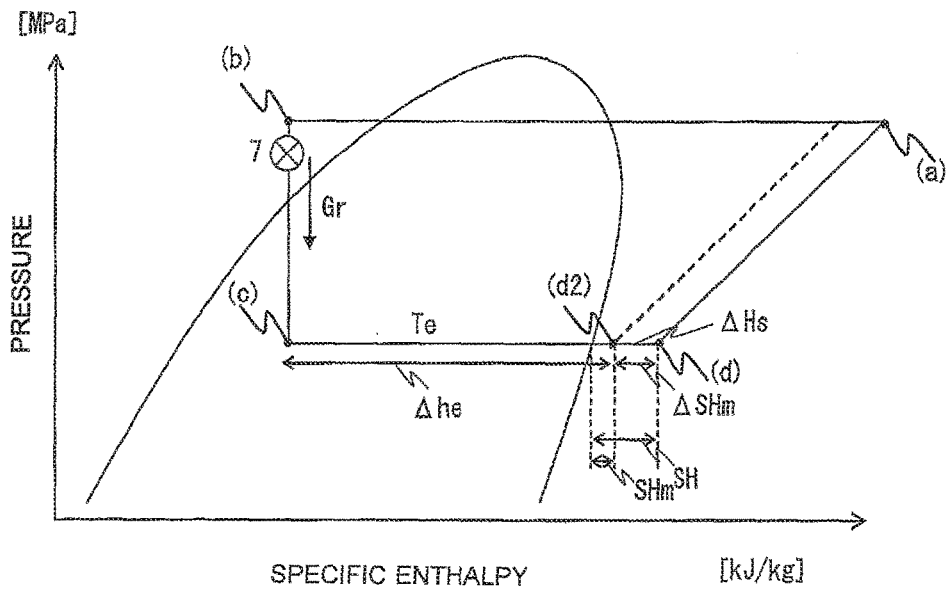
FIG. 2 is a p-h diagram of the air-conditioning apparatus according to Embodiment 1 of the present invention.

Then, assume that, when the current suction state of the compressor is in the state of (d) of FIG. 2, the degree of superheat at that time is denoted by SH, the expansion device 7 is opened by an operation performed once, and the expansion device 7 is successfully controlled such that the state of a target degree of superheat SHm of (d2) of FIG. 2 is achieved. In this case, it is assumed that the high-pressure side pressure or low-pressure side pressure in the refrigeration cycle does not change and the cooling capacity in the indoor heat exchanger 6 is the same. When the drive opening degree of an electric pulse motor that controls the area of the opening port of the expansion device 7 is LP [pulse], the amount of a circulating refrigerant that passes through the expansion device 7 is proportional to LP. Assume that a current opening degree is LP and an opening degree change amount required in controlling the degree of superheat to the target degree of superheat SHm by an operation performed once is ΔLP. In addition, when a deviation of the current degree of superheat SH, which is a control object, from the target degree of superheat SHm is expressed as ΔSHm=SH−SHm, the specific enthalpy difference ΔHs [kJ/kg] between (d) and (d2) can be expressed by the following expression.

$$\Delta Hs = Cpg \times \Delta SHm \quad \text{(Expression 1)(Math. 1)}$$

In this expression, Cpg is gas specific heat at constant pressure [kJ/kgK]. This value is specifically calculated from the value of the pressure of the pressure sensor 51 and the value from the thermal sensor 44 of the suction unit of the compressor 3. Also, on the basis of the assumption that cooling capacity is constant before and after the operation of the expansion device 7 and the assumption that the amount of a circulating refrigerant is proportional to LP, the following expression holds.

$$LP \times (\Delta He + \Delta Hs) = (LP + \Delta LP) \times \Delta He \quad \text{(Expression 2)(Math. 2)}$$

In this expression, ΔHe denotes the enthalpy change of a refrigerant in an evaporator (the indoor heat exchanger 6 in a cooling operation) when the degree of superheat of the refrigerant sucked into the compressor 3 is the target degree of superheat SHm. Specifically, the enthalpy difference ΔHe can be calculated by deducting an enthalpy Hei calculated from the values of the pressure sensor 52 and the thermal sensor 45 at an inlet of the expansion device 7 from an enthalpy Heo calculated from the temperature obtained by adding the target degree of superheat SHm to the saturated gas temperature obtained from the pressure of the pressure sensor 51. When Expression 1 and Expression 2 are put together by substituting Expression 1 into Expression 2, the following expression holds.

$$\Delta LP = Cpg / \Delta He \times LP \times \Delta SHm \quad \text{(Expression 3)(Math. 3)}$$

Expression 3 represents the relationship between the deviation ΔSHm, which is a control object, and the operation amount ΔLP, and thus, Cpg/ΔHeΔLP on the right side represents a response gain (which will be hereinafter referred to as K∞) that is the control object used for achieving the control target value by an operation performed once.

Since the air-conditioning apparatus 100 is to be controlled at certain control intervals CI [sec], when the control is performed with the response gain K∞, an operation is performed a plurality of times whereas the operation amount may be sufficient by a control operation performed once, and therefore, under certain circumstances, the air-conditioning apparatus 100 is excessively operated, thus causing hunting. Therefore, as an actual control gain (which will be hereinafter referred to as K), a value smaller than the response gain K∞ has to be selected. In order to obtain the optimal control gain K that is to be selected, the change of the degree of superheat SH is set to be a "dead time+first order lag" system, and a control response characteristic corresponding to this system is quantified.

Figure 3:
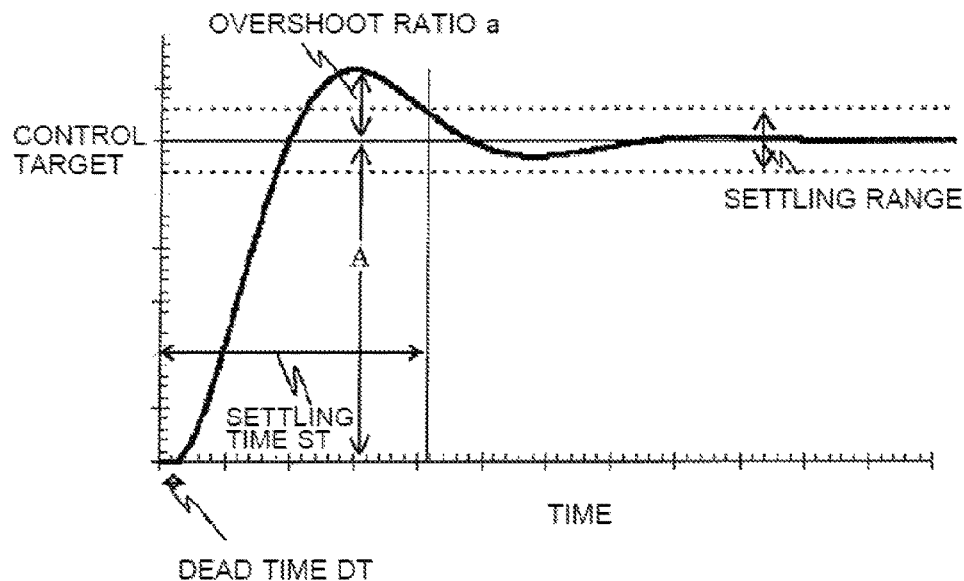
FIG. 3 is a conceptual diagram illustrating change that occurs when a control object is controlled to be a control target value in a dead time + first order lag system.

FIG. 3 illustrates the response characteristic of a control object of the "dead time+first order lag" system. When the control gain is set to be a certain value in a control system, an operation amount is changed in a stepwise manner, and the response characteristic of the control amount is plotted, a graph of FIG. 3 is obtained. The maximum value with which the control amount exceeds the control target value is, in general, called overshoot amount or overshoot. The time which it takes for the control amount to be in a settling range, which is a desired allowable range, with the control target value centered is called settling time ST. It is assumed that the deviation of the current control amount from the control target value is A and the overshoot amount is a, a/A is defined as the overshoot ratio. The dead time DT is, in other words, a time period from the time when an opening degree change order is issued to the expansion device 7 to the time when a change appears in the control target object.

In an air-conditioning apparatus, in view of energy-saving effectiveness and the characteristics of load following, a fast response to a target value is desired, but when the settling time is reduced, the overshoot ratio increases. Depending on conditions, there are cases where the overshoot ratio is not allowable. For example, a high-pressure refrigerant, such as an R32 refrigerant, has a high specific heat ratio because of the characteristics of the refrigerant, and the discharge temperature of the refrigerant from the compressor tends to rise. When the discharge temperature is a control object, with a large overshoot ratio, the efficiency of the compression is reduced due to demagnetization of a magnet used in a motor of the compressor 3 and damage is caused by burning of a refrigerating machine oil, as a result of a rise in discharge temperature, thus, the overshoot ratio has to be reduced.

Figure 4:
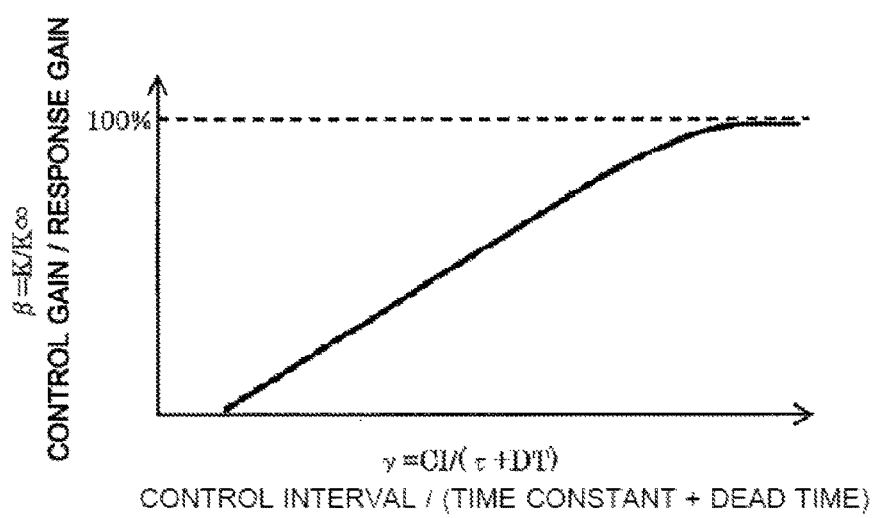
FIG. 4 is a graph illustrating the relationship among control interval, time constant, dead time, response gain, and control gain obtained when maximum overshoot ratio is fixed.

FIG. 4 is a graph illustrating a state in which the overshoot ratio is the maximum value in a desired settling range. That is, FIG. 4 illustrates the relationship of the control gain ratio $\beta$ (=K/K∞), defined as the ratio of the control gain K to the response gain K∞, in relation to the control interval CI, the time constant $\tau$, and the dead time DT. The abscissa and the ordinate are both dimensionless, and therefore, in the "dead time+first order lag" system, this relationship is kept at all times. For example, it is indicated that, when the control interval CI and the certain dead time DT are constant, as the time constant $\tau$ increases, the response speed of the system decreases, and therefore, the control gain ratio $\beta$ has to be reduced. It is also indicated that, when the time constant $\tau$ and the certain dead time DT are constant, as the control interval CI decreases, the control gain ratio $\beta$ has to be reduced.

Thus, for example, when the control interval CI is fixed, the control gain ratio $\beta$ is calculated in accordance with the time constant $\tau$ and the dead time DT of the system of an object to determine the control gain K, thus realizing an optimal operation in which the settling time is minimum under the condition where the overshoot ratio is a desired ratio or less at all times.

Figure 5:
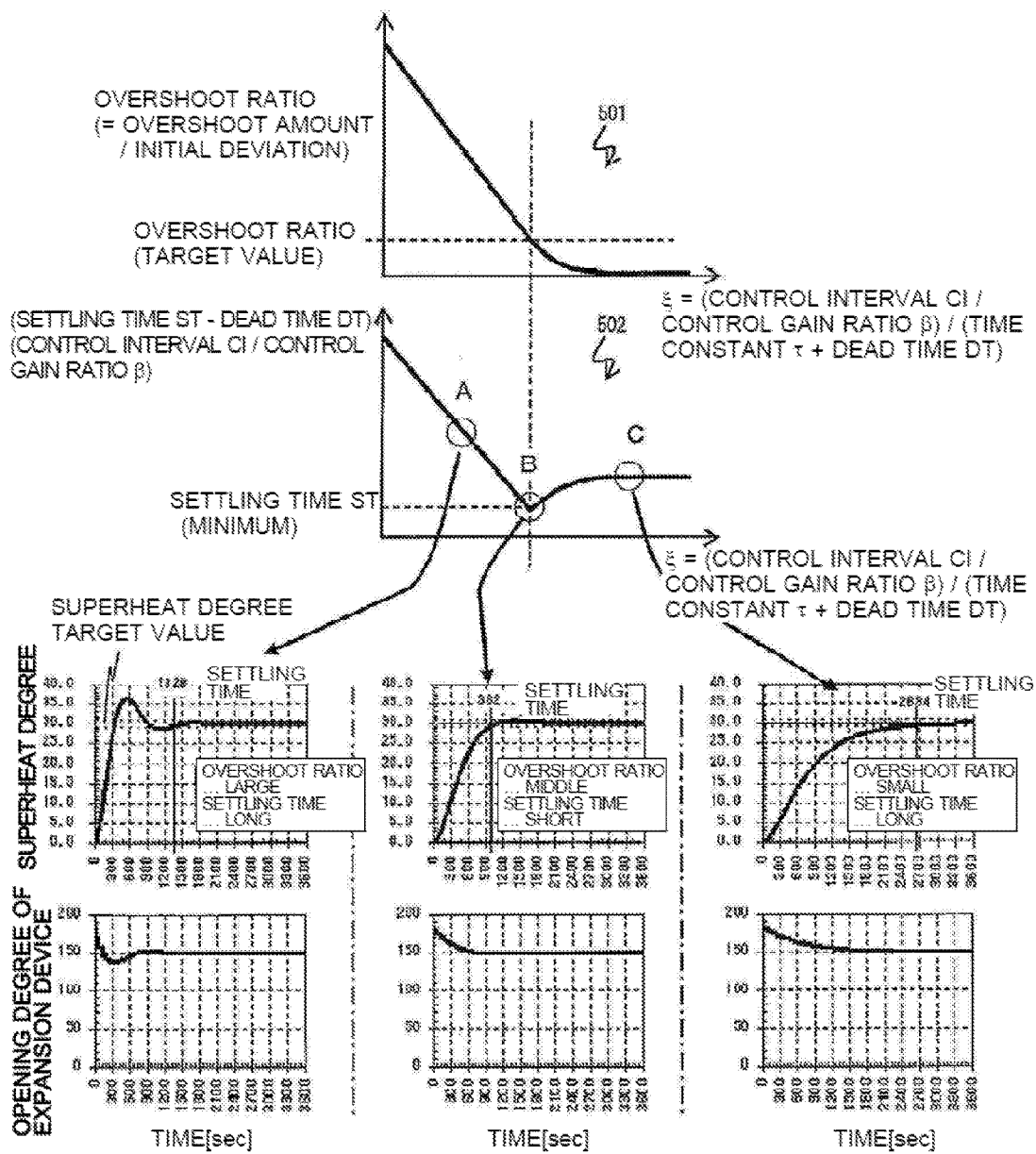
FIG. 5 is a diagram illustrating the relationship of overshoot ratio and settling time with control interval, time constant, dead time, and control gain ratio.

FIG. 5 is a diagram illustrating the relationship of the overshoot ratio a/A and the settling time ST using, as parameters, the control interval CI, the time constant $\tau$, the dead time DT, and the control gain ratio $\beta$. In graphs 501 and 502 in the upper part of FIG. 5, the abscissa is a dimensionless parameter or index under the definition of $\xi$=(the control interval CI/the control gain ratio $\beta$)/(the time constant $\tau$/the dead time DT).

In the graph 501 of FIG. 5, the ordinate is the overshoot ratio, and the graph 501 indicates that, for example, assuming that the control gain ratio $\beta$, the time constant $\tau$, and the dead time DT are fixed, as the control interval CI increases, the overshoot ratio decreases.

In the graph 502 of FIG. 5, the ordinate corresponds to the settling time, and the graph 502 indicates that, for example, assuming that the control interval CI, the time constant $\tau$, and the dead time DT are fixed, when the control gain ratio $\beta$ is larger than $\beta$ (B in FIG. 5) with the parameter $\xi$m with which the settling time is minimum (A in FIG. 5), the overshoot ratio increases and the hunting increases, so that the settling time is increased. The graph 502 indicates that, on the other hand, when the control gain ratio $\beta$ is smaller than $\beta$ (B in FIG. 5) with the parameter $\xi$m with which the settling time is minimum (C in FIG. 5), the overshoot ratio is small whereas the change amount is small and the settling time is long.

The parameter $\xi$m with which the settling time is minimum is a value (specifically, 2 to 3) determined by settling of the allowable settling range of the system as a control object. On the other hand, the time constant $\tau$ and the dead time DT of the system as a control object are determined in accordance with an operation state. Therefore, at least one of the control interval CI and the control gain ratio $\beta$ is changed such that the relationship of the parameter $\xi$m, with which the settling time is minimum, =(the control interval CI/the control gain ratio $\beta$)/(the time constant $\tau$+the dead time DT), and thus, an optimal operation in which the settling time is minimum under the condition where the overshoot ratio is a desired ratio or less at all times.

The time constant $\tau$ as a control object will be described with reference to FIG. 6. Assuming a case of the first-order lag system, in accordance with the law of mass conservation, the time constant $\tau$ of the degree of superheat SH can lead a linear correlation expression with a value obtained by dividing the internal capacity Vcond [m$^3$] of a condenser with a large existing refrigerant amount by a product obtained by multiplying the displacement Vst [m$^3$] of the compressor 3 by the compressor frequency f [Hz] and then by the volumetric efficiency $\eta$v [-] of the compressor. Therefore, holding in advance the internal capacity of the indoor heat exchanger 6, the internal capacity of the outdoor heat exchanger 9, and the displacement amount of the compressor 3 as information allows estimation of the time constant $\tau$ of the degree of superheat SH on the basis of the compressor frequency f specified by the control unit 17. The volumetric efficiency $\eta$v of the compressor may be a fixed value (for example, 0.9), and also, may be calculated as a function of the operating frequency f of the compressor and the compression ratio between a high pressure measured by the pressure sensor 52 and a low pressure measured by the pressure sensor 51.

The value of the parameter m with which the settling time is minimum is about 2 to 3 and, when it is assumed that the dead time DT is substantially zero, the control gain ratio $\beta$ is 1 or less, and therefore, the control interval CI of the system of the control object may be set to three times the time constant $\tau$ or less. That is, when the control gain ratio $\beta$ is increased, the control interval CI is large and the number of times of driving a drive unit that drives an electric expansion valve is reduced, so that abrasion of a slide unit of the electric expansion valve is reduced and reliability is increased.

Next, control of the degree of superheat SH of the expansion device 7 performed in consideration of the above-described control responsiveness will be described with reference to the flow charts of FIG. 7 and FIG. 8.

Figure 7:
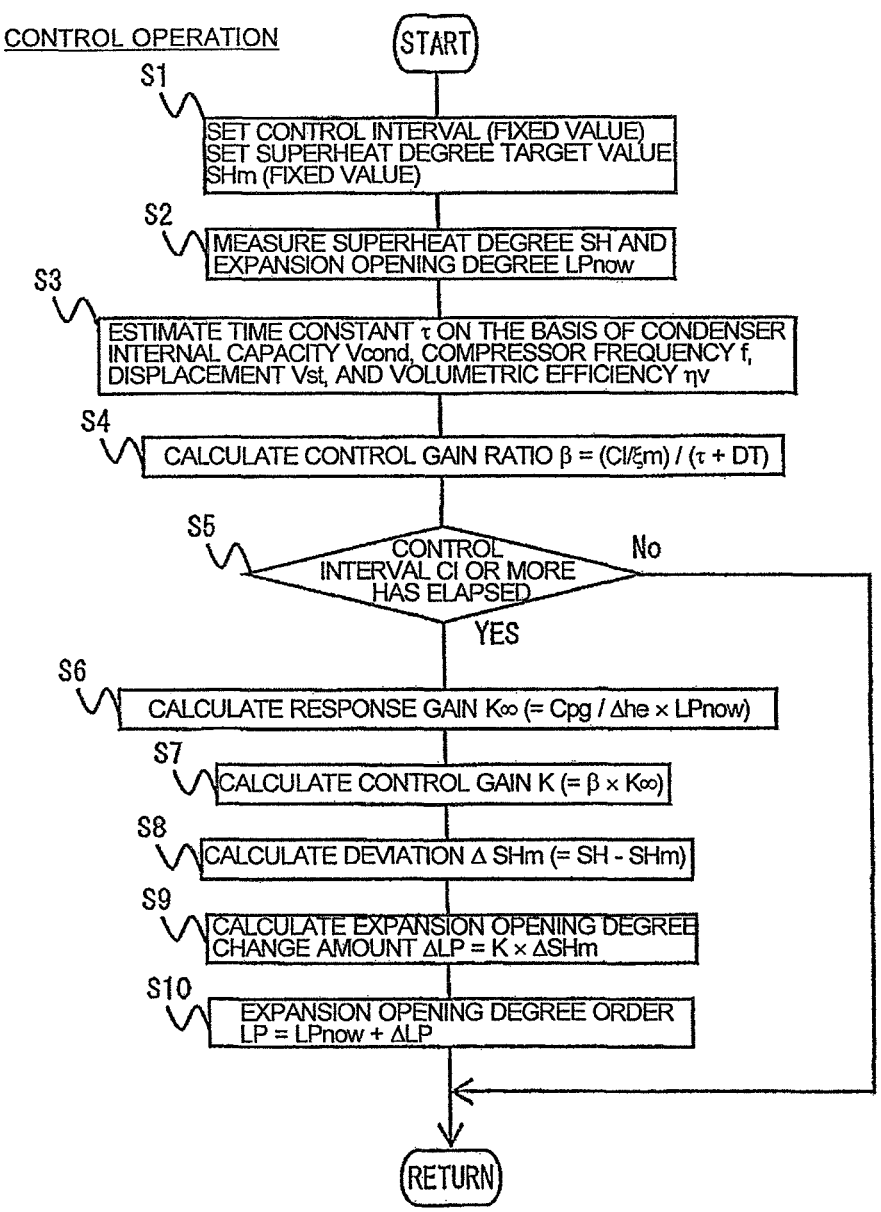
FIG. 7 is a flow chart of control performed on an expansion device when control interval is fixed in the air-conditioning apparatus according to Embodiment 1 of the present invention.

FIG. 7 is a flow chart of control performed when the control interval CI is fixed. First, in the measurement control device 18, the control interval CI and the target degree of superheat SHm are set in advance (S1). Note that, because of energy-saving effectiveness in a refrigeration cycle, as the target degree of superheat SHm decreases, the energy-saving effect increases. Next, in the measurement unit 16, the degree of superheat SH of the compressor 3 and the current opening degree LPnow of the expansion device 7 are measured (S2). Next, in a time constant calculation means 20, the time constant $\tau$ is estimated on the basis of information about the condenser internal capacity Vcond, the compressor frequency f of the compressor 3, the displacement Vst of the compressor 3, and the volumetric efficiency $\eta$v of the compressor 3 (S3). Note that, because the condenser internal capacity is proportional to the horse power of the air-conditioner, the condenser internal capacity can be estimated to some extent on the basis of the maximum operating capacity of the compressor and the like and, on the other hand, the displacement of the compressor can be estimated to some extent on the basis of the horse power of the air-conditioner.

Next, in a control constant calculation means 21, the control gain ratio $\beta$ is calculated using the control interval CI, the minimum settling time specific parameter $\xi$m (a value), the time constant $\tau$, and the dead time DT (S4). In this case, since the dead time DT is substantially zero, the dead time DT may be set as a fixed value in advance. Next, it is determined whether or not time corresponding to the control interval CI or more has elapsed since the previous operation of the expansion device 7 (S5). If time corresponding to the control interval CI or more has elapsed, in the control constant calculation means 21, the response gain K∞(=Cpg/Δhe×LPnow) is calculated on the basis of each value obtained from the operating state of the refrigeration cycle (S6). Next, in the control constant calculation means 21, the control gain K (=β×K∞) is calculated (S7). Next, a deviation ΔSHm (=SH−SHm) of the degree of superheat SH from the target degree of superheat SHm is calculated (S8). Next, in a control constant change means 22, the control gain K is changed and the changed control gain K and the deviation ΔSHm are multiplied to calculate the opening degree change amount ΔLP=(K×ΔSHm) of the expansion device 7 (S9). Next, in an expansion device control means 23, the opening degree change amount ΔLP is added to the current opening degree LPnow of the expansion device 7 to calculate the opening degree LP=LPnow+ΔLP, and the opening degree of the expansion device 7 is set to be the calculated expansion opening degree LP (S10).

Figure 8:
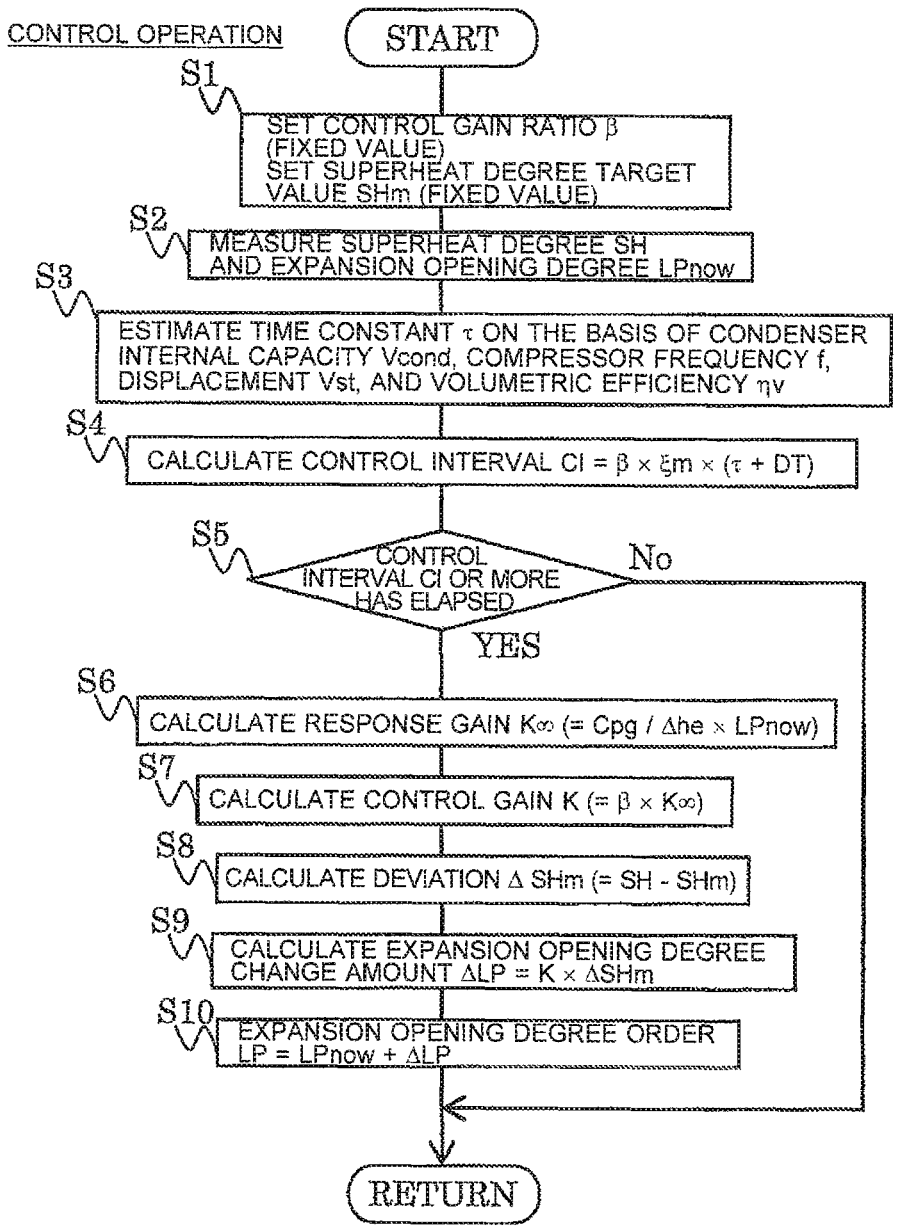
FIG. 8 is a flow chart of control performed on the expansion device when control gain ratio is fixed in the air-conditioning apparatus according to Embodiment 1 of the present invention.

FIG. 8 is a flow chart of control performed when the control gain ratio β is fixed. The control method is basically similar to the method illustrated in FIG. 7, but this control method is different from that of FIG. 7 in that, in Step S4, an optimal control interval CI is calculated each time so that the control interval is variable.

When the air-conditioning apparatus is controlled in the above-described manner, an optimal operation in which the settling time is minimum under the condition where the overshoot ratio is within an allowable range at all times can be achieved in accordance with the system configuration and operating state of the air-conditioning apparatus.

Note that, in Embodiment 1, a cooling operation has been described, but even in a heating operation, the expansion device 7 can be controlled in a similar manner in accordance with the above-described control method. In a heating operation, load side heat exchanger internal capacity information is replaced with the condenser internal capacity Vcond, but the flow charts corresponding to FIG. 7 and FIG. 8 are the same as those of FIG. 7 and FIG. 8.

The state quantity of the refrigeration cycle, which is a control amount, is the degree of superheat SH, but for the refrigerant temperature at the discharge side of the compressor 3 (the temperature detected by the thermal sensor 43) or the degree of supercooling SC at the outlet of the outdoor heat exchanger 9, a similar operation to the foregoing can be performed by changing a value which has been set in advance in the measurement control device 18, and such an operation is not out of the scope of the present invention.

In Embodiment 1, a case where a single indoor unit is provided at the load side has been described, but even in a multi-type air-conditioning apparatus including a plurality of indoor units, similar advantages may be achieved.

Furthermore, in Embodiment 1, a case where the compressor 3 is a capacity variable compressor has been described, but even in an air-conditioning apparatus including a constant-velocity compressor, similar advantages may be achieved.

The invention claimed is:

1. An air-conditioning apparatus in which at least one load side unit including a load side heat exchanger is connected to a heat source side unit including a compressor, a heat source side heat exchanger, and an expansion device, and a refrigerant is circulated between the units to form a refrigeration cycle, the apparatus comprising:
a controller configured to
estimate a time constant of a control value at a time when an opening degree of the expansion device is changed, the control value is at least one of a degree of superheat at a suction side of the compressor, a temperature of the refrigerant at a discharge side of the compressor, and a degree of subcooling at an outlet side of the heat source side heat exchanger which is serving as a condenser,
calculate at least one of a control gain of the opening degree of the expansion device and a control interval of the expansion device on the basis of the control value;
change the control gain or the control interval on the basis of the calculated at least one of the control gain and the control interval, and
change the opening degree of the expansion device on the basis of the changed at least one of the control gain and the control interval,
wherein the time constant is estimated using a relationship that a parameter=(control interval/control gain ratio)/(time constant+dead time), wherein
the parameter is a dimensionless parameter with which a settling time is minimum,
the settling time is a time for the control value to be in a predetermined range from a control target value,
the gain ratio is a value obtained by dividing the control gain by a response gain of the control value in order to cause the control gain to be a control target gain value by an operation performed once, and
the dead time is a time from a time when an opening degree change order is issued to the expansion device to a time when a change appears in the control value.

2. The air-conditioning apparatus of claim 1, wherein the controller is further configured to calculate the time constant so that the control interval is set to be three times the time constant or less.

3. The air-conditioning apparatus of claim 1, wherein, the controller is further configured to use information regarding an operating frequency of the compressor when estimating the time constant.

4. The air-conditioning apparatus of claim 3, wherein the controller is further configured to use information regarding at least one of an internal refrigerant capacity of the heat source side heat exchanger, an internal refrigerant capacity of the load side heat exchanger, and a displacement of the compressor when estimating the time constant.

5. The air-conditioning apparatus of claim 3, wherein the controller is further configured to use a volumetric efficiency of the compressor when estimating the time constant, the volumetric efficiency is estimated on the basis of a discharge pressure, a suction pressure, and an operating frequency of the compressor.

6. The air-conditioning apparatus of claim 1, wherein the controller is further configured to estimate the time constant assuming that the dead time is zero.

7. The air-conditioning apparatus of claim 1, further comprising a measurement unit that measures the control value of the refrigeration cycle of the air-conditioning apparatus.

* * * * *